(12) United States Patent
Fassbender

(10) Patent No.: US 6,893,566 B2
(45) Date of Patent: May 17, 2005

(54) SEWAGE TREATMENT SYSTEM

(76) Inventor: Alexander G. Fassbender, 3100 George Washington Way, Suite 153, Richland, WA (US) 99352

( * ) Notice: Subject to any disclaimer, the term of this patent is extended or adjusted under 35 U.S.C. 154(b) by 0 days.

(21) Appl. No.: 10/375,809

(22) Filed: Feb. 26, 2003

(65) Prior Publication Data

US 2004/0164019 A1 Aug. 26, 2004

(51) Int. Cl.⁷ .............................. C02F 3/30; C02F 11/04; C02F 11/18
(52) U.S. Cl. ....................... 210/603; 210/605; 210/609; 210/613; 435/262.5
(58) Field of Search ................................ 210/603, 605, 210/612, 613, 620, 621, 623, 630, 609; 435/262, 262.5; 48/127.3

(56) References Cited

U.S. PATENT DOCUMENTS

| | | | | |
|---|---|---|---|---|
| 3,959,125 A | * | 5/1976 | Teletzke ..................... | 210/603 |
| 3,973,043 A | * | 8/1976 | Lynn .......................... | 426/55 |
| 3,980,556 A | * | 9/1976 | Besik ......................... | 210/616 |
| 4,246,099 A | * | 1/1981 | Gould et al. ................ | 210/603 |
| 5,256,251 A | * | 10/1993 | Holcombe ................. | 159/47.3 |
| 5,264,009 A | * | 11/1993 | Khan ......................... | 48/197 R |
| 5,282,980 A | * | 2/1994 | Kew et al. .................. | 210/787 |
| 5,292,442 A | * | 3/1994 | Khan et al. ................. | 210/770 |
| 5,746,919 A | * | 5/1998 | Dague et al. ............... | 210/603 |
| 5,833,856 A | * | 11/1998 | Liu et al. .................... | 210/605 |
| 5,846,425 A | * | 12/1998 | Whiteman .................. | 210/606 |
| 5,853,589 A | * | 12/1998 | Desjardins et al. ......... | 210/605 |
| 6,090,240 A | * | 7/2000 | Eneberg et al. ............. | 159/47.3 |
| 6,113,789 A | * | 9/2000 | Burke ......................... | 210/609 |
| 6,291,232 B1 | * | 9/2001 | Miller, III .................. | 435/262 |
| 6,325,935 B1 | * | 12/2001 | Hojsgaard ................... | 210/609 |
| 6,444,124 B1 | * | 9/2002 | Onyeche et al. ............ | 210/603 |

* cited by examiner

Primary Examiner—Fred G. Prince
(74) Attorney, Agent, or Firm—Speed & Rogers, P.A.

(57) ABSTRACT

A sewage treatment system is disclosed in which a waste stream is separated into a primary sludge and water effluent, and the primary sludge is anaerobically digested and dewatered to produce a Class A biosolid. The water effluent is aerobically digested and separated to provide a waste activated sludge. The waste activated sludge is heated in a two-stage process with steam injection and indirect steam before it is passed to a hydrothermal process. The pH of the treated waste activated sludge is then increased, and the nitrogen is stripped and recovered as an ammonium salt. A low nitrogen stream with volatile fatty acids and soluble organics is then separated and fed to the aerobic digester. Biogas generated during anaerobic digestion provides energy for heating the waste activated sludge for the hydrothermal process, and reject heat from the hydrothermal process heats the primary sludge for thermophilic anaerobic digestion.

20 Claims, 5 Drawing Sheets

FIG. 3A

| | DTPD | WTPD | SOLIDS % | TPM | GPM | PRES, PSIA | PRES, BAR | TEMP C | TEMP F | DENSITY KG/M3 |
|---|---|---|---|---|---|---|---|---|---|---|
| A PRIMARY SLUDGE FROM CLARIFIER | 50 | 3,333 | 1.5% | 2,023 | 534 | 14.7 | 1.0 | 20 | 68 | 998 |
| B THICKENED PRIMARY SLUDGE* | 50 | 833 | 6.0% | 506 | 133 | 14.7 | 1.0 | 20 | 68 | 998 |
| C THICKENER RETURN | - | 2,500 | 0.0% | 1,517 | 400 | 14.7 | 1.0 | 20 | 68 | 998 |
| D HEATED PRIMARY SLUDGE TO DIGESTER | 50 | 883 | 6.0% | 514 | 136 | 14.7 | 1.0 | 60 | 140 | 993 |
| E DIGESTED PRIMARY SLUDGE | 20 | 803 | 2.5% | 495 | 131 | 14.7 | 1.0 | 60 | 140 | 993 |
| F BIOGAS FROM DIGESTER | 30 | - | 100% | - | - | 14.7 | 1.0 | 60 | 140 | 993 |
| G DEWATERED CLASS A SLUDGE | 20 | 80 | 25% | 49 | 13 | 14.7 | 1.0 | 60 | 140 | 993 |
| H DEWATERING RETURN | - | 703 | 0.0% | 431 | 114 | 14.7 | 1.0 | 60 | 140 | 993 |
| I WAS FROM CLARIFIER | 50 | 5,556 | 0.9% | 3,405 | 899 | 14.7 | 1.0 | 20 | 68 | 998 |
| J WAS FROM GRAVITY THICKENER | 50 | 1,429 | 3.5% | 876 | 231 | 14.7 | 1.0 | 20 | 68 | 998 |
| K GRAVITY THICKENER RETURN | - | 4,127 | - | 2,529 | 668 | 14.7 | 1.0 | 20 | 68 | 998 |
| L WAS FROM BELT THICKENER | 50 | 833 | 6.0% | 511 | 135 | 14.7 | 1.0 | 20 | 68 | 998 |
| M BELT THICKENER RETURN | - | 3,294 | - | 2,019 | 533 | 14.7 | 1.0 | 20 | 68 | 998 |

| # | | DTPD | WTPD | SOLIDS % | TPM | GPM | PRES, PSIA | PRES, BAR | TEMP C | TEMP F | DENSITY KG/M 3 |
|---|---|---|---|---|---|---|---|---|---|---|---|
| 1 | THICKENED WASTE ACTIVATED SLUDGE | 50 | 833 | 6.0% | 511 | 135 | 14.7 | 1.0 | 20 | 68 | 998 |
| 1a | LOW P PREHEAT OF WAS | 50 | 833 | 6.0% | 518 | 135 | 14.7 | 1.0 | 57 | 135 | 984 |
| 2 | STEAM INJECTION PREHEATED WAS | — | 80.4 | — | 49 | 13 | 1,246 | 85.9 | 300 | 572 | 712 |
| 2a | COUNTERCURRENT PREHEATED WAS | 50 | 914 | 5.5% | 706 | 186 | 862 | 59.5 | 255 | 491 | 791 |
| 3 | HEATED WAS TO REACTOR | 50 | 914 | 5.5% | 736 | 194 | 862 | 59.5 | 275 | 527 | 759 |
| 4 | REACTOR EFFLUENT | 50 | 914 | 5.5% | 736 | 194 | 862 | 59.5 | 275 | 527 | 759 |
| 5 | REACTOR EFFLUENT TO NaOH MIXER | 50 | 914 | 5.5% | 599 | 158 | 862 | 59.5 | 133 | 271 | 932 |
| 6 | NaOH ADDITION | 4 | 12 | 33.3% | 6.3 | 1.7 | 862 | 59.5 | 20 | 68 | 998 |
| 7 | REACTOR EFFLUENT FROM MIXER | 50 | 926 | 5.4% | 591 | 156 | 862 | 59.5 | 100 | 212 | 958 |
| 8 | REACTOR EFFLUENT FROM FLASH | 45.8 | 873 | 5.2% | 557 | 147 | 25 | 1.7 | 100 | 212 | 958 |
| 9 | FLASHED VAPOR | 4.3 | 48 | 8.8% | 33,805 | 8,922 | 25 | 1.7 | 100 | 212 | 0.983 |
| 10 | COOLED REACTOR EFFLUENT | 45.8 | 873 | 5.2% | 538 | 142 | 14.7 | 1.0 | 40 | 104 | 992 |

FIG. 3B

| # | | DTPD | WTPD | SOLIDS % | IPM | GPM | PRES, PSIA | PRES, BAR | TEMP C | TEMP F | DENSITY KG/M^3 |
|---|---|---|---|---|---|---|---|---|---|---|---|
| 11 | SETTLED SOLIDS TO DEWATERING | 22.9 | 254 | 9.0% | 157 | 41 | 14.7 | 1.0 | 40 | 104 | 992 |
| 12 | DISOLVED&SUSP. SOLIDS TO FILTERS | 18.3 | 619 | 3.0% | 382 | 101 | 14.7 | 1.0 | 40 | 104 | 992 |
| 13 | CONCENTRATED SOLIDS TO DIGESTER | 6.9 | 69 | 10% | 42 | 11 | 14.7 | 1.0 | 40 | 104 | 992 |
| 14 | SOLUBLE ORGANICS TO WWTP | 11.4 | 550 | 2.1% | 339 | 90 | 14.7 | 1.0 | 40 | 104 | 992 |
| 15 | DEWATERED THERMOFUEL | 18.3 | 25 | 74% | 15 | 4 | 14.7 | 1.0 | 40 | 104 | 992 |
| 16 | SULFURIC ACID ADDITION | 16.5 | 18 | 94.0% | 11 | 3 | 14.7 | 1.0 | 40 | 104 | 992 |
| 17 | VAPOR TO COOLER | – | 38 | – | 40,389 | 10,660 | 14.7 | 1.0 | 100 | 212 | 0.598 |
| 18 | AMMONIUM SULFATE PRODUCT | 20.8 | 28 | 75.0% | 18 | 5 | 14.7 | 1.0 | 100 | 212 | 958 |
| 19 | CONDENSED VAPOR TO WWTP | – | 38 | – | 24 | 6 | 14.7 | 1.0 | 70 | 158 | 978 |
| 20 | STEAM TO INJECTOR | – | 80.4 | – | 1,099 | – | 1,246 | 85.9 | 300 | 572 | 46 |
| 21 | STEAM TO HEAT EXCHANGER | – | 59.5 | – | 814 | – | 1,246 | 85.9 | 300 | 572 | 46 |

FIG. 3C

SEWAGE TREATMENT SYSTEM

BACKGROUND OF THE INVENTION

This invention relates to a sewage treatment system and, more particularly to a wastewater treatment system.

Wastewater treatment systems are well known in the art. Typical wastewater treatment systems generate raw primary sludge and waste activated sludge, which they typically thicken, heat, and digest in anaerobic digesters. Anaerobic digesters are typically operated under mesophilic conditions, from approximately 20° C. to approximately 35° C., and the product from these digesters is typically dewatered to produce Class B sludge. The Class B sludge is typically hauled away to land application or is composted or lagooned to produce a Class A sludge. The National Institute of Occupational Safety and Health (NIOSH) has classified Class B sludge as a biohazard, so the wastewater treatment industry is moving away from producing Class B sludge and toward producing Exceptional Quality Class A sludge (EQ Class A). The present invention combines a number of known elements in new and creative ways with a surprising synergy of mechanical, thermal, and chemical integration to generate EQ Class A sludge at low capital and operating cost.

U.S. Pat. No. 5,221,486, issued in 1993 to Fassbender, U.S. Pat. No. 5,433,868, issued in 1995 to Fassbender, U.S. Pat. No. 5,785,852, issued in 1998 to Rivard et al. in 1998, and U.S. Pat. No. 6,143,176, issued in 2000 to Nagamatsu et al., describe and disclose a number of prior art approaches to wastewater treatment systems. The disclosures of U.S. Pat. Nos. 5,221,486, 5,433,868, 5,785,852, and 6,143,176 are incorporated herein by reference. Waste activated sludge is more difficult to dewater and digest because of its hydrophilic and cellular nature. To address this problem, the '852 patent discloses the use of low temperature heat, in the range from 180° F. to 385° F., and explosive flash and shear forces to disrupt cells so that the soluble material in the cells is released and available for anaerobic digestion. The '868 patent describes a process in which a combined stream of waste activated sludge and primary sludge is treated at high temperature hydrothermal conditions to produce oil, char, and an ammonia containing wastewater stream. The wastewater stream is further processed with another hydrothermal process to convert the ammonia to nitrogen gas. The '176 patent describes the use of a hydrothermal process for heating anaerobically digested sludges to generate a carbon slurry that is dewatered to provide a concentrated carbon slurry of char and oil having a high heating value. The aqueous phase separated from the carbon slurry to form the concentrated carbon slurry is returned for additional anaerobic digestion.

These systems offer a number of advantages in processing wastewater. They generally do a relatively good job of recovering valuable resources from wastes and of reducing the amounts of such wastes that must be sent to landfills. Still, they suffer from a number of disadvantages. For example, because the sludges contain large amounts of water, subjecting both a primary sludge and a waste activated sludge to one or more hydrothermal processes requires a great deal of energy just to heat and cool the water contained therein. Combining the primary sludge and waste activated sludge in an anaerobic digester would result in a large energy demand to heat the anaerobic digester feed, particularly if the anaerobic digester is to be operated under more desirable thermophilic conditions. Combining the primary sludge and waste activated sludge in an anaerobic digester would also tend to force an operator to choose between undesirably increased capital cost or undesirably decreased treatment time. Similarly, combining the primary sludge and waste activated sludge in the anaerobic digester would also force an operator to choose between undesirably increased operating costs for heating or undesirably low operating temperature, perhaps leading to the use of acceptable but less desirable mesophilic conditions rather than thermophilic conditions. Further, the primary sludge typically includes more solids and particulate matter that is hard on equipment operating at high temperature and pressure, such as the conditions typically encountered in hydrothermal processes. Again, heating both the primary sludge and the waste activated sludge to the high temperatures called for in a hydrothermal process requires a great deal of energy. Also, in systems that use aerobic and anoxic zones in a digester to treat the water effluent and generate the waste activated sludge, maintaining optimal conditions for the nitrate reducing and phosphourus accumulating bacteria in the aerobic/anoxic digester typically requires additional raw sewage to be fed into the aerobic/anoxic digester or that a water soluble carbon source such as methanol feed stream be provided. Further still, the sludges often cause clogging or fouling problems, as they are being prepared for and passed to and through hydrothermal processes. This common problem typically leads to the use of scraped surface heat exchangers in an effort to combat or counter such problems. Also, because the primary sludge and waste activated sludge are typically treated together or at similar temperature ranges, there is little or no opportunity for efficient heat transfer between the two to offset operating expenses.

SUMMARY OF THE INVENTION

It is therefore an object of the present invention to provide a waste treatment system that takes advantage of surprising synergy of mechanical, thermal, and chemical integration to generate an EQ Class A biosolid at low capital and operating costs.

It is a further object of the present invention to provide a system of the above type that uses thermal energy from generated biogas to supply heat for a hydrothermal process.

It is a still further object of the present invention to provide a system of the above type that uses thermal energy from generated biogas to supply between 50 to 100 percent of the heat energy required for the hydrothermal process.

It is a still further object of the present invention to provide a system of the above type that uses thermal energy from a hydrothermal process to provide heat for operating an anaerobic digester at thermophilic conditions.

It is a still further object of the present invention to provide a system of the above type that uses thermal energy from generated biogas twice, first to provide heat for a hydrothermal process and then to provide heat for an anaerobic digester.

It is a still further object of the present invention to provide a system of the above type that allows for increased operating temperatures and retention times in an anaerobic digester without undesirable increases in capital or operating costs.

It is a still further object of the present invention to provide a system of the above type that significantly increases sludge retention time available at an existing anaerobic digestion facility.

It is a still further object of the present invention to provide a system of the above type that provides for the production of EQ Class A biosolids by increasing fermentation temperature and duration without undesirably increasing capital and operating costs.

It is a still further object of the present invention to provide a system of the above type that reduces the amount of feed material that must be heated to high temperatures in a hydrothermal process.

It is a still further object of the present invention to provide a system of the above type that strips nitrogen from a waste activated sludge, and recovers the nitrogen in the form of an ammonia-water solution or an ammonium salt, without the need for a separate hydrothermal process.

It is a still further object of the present invention to provide a system of the above type that provides for enhanced performance of bacteria in the aerobic/anoxic digester.

It is a still further object of the present invention to provide a system of the above type that offers enhanced biological nitrogen removal and biological phosphorus removal in the aerobic/anoxic digester.

It is a still further object of the present invention to provide a system of the above type to recover a low nitrogen stream containing volatile fatty acids and soluble organics for recycle to the aerobic/anoxic digester.

It is a still further object of the present invention to provide a system of the above type that reduces or eliminates fouling and clogging problems encountered in processing sludges in a hydrothermal process.

It is a still further object of the present invention to provide a system of the above type that uses staged heating for the hydrothermal process to avoid fouling and clogging problems while reducing boiler feed water consumption, further reducing capital and operating costs.

It is a still further object of the present invention to provide a system of the above type that reduces or eliminates the amount of grit, solids, and large particulates that must be pumped through process equipment, particularly through hydrothermal process equipment that is operated at high temperatures and pressures, thereby reducing capital costs and increasing reliability.

Toward the fulfillment of these and other objects and advantages, in a system of the present invention, a waste stream is separated into a primary sludge and a water effluent, and the primary sludge is anaerobically digested and dewatered to produce a Class A biosolid. The water effluent is digested in a digester having aerobic and anoxic zones and excess bacteria are separated to provide a waste activated sludge. The waste activated sludge is heated in a two-stage process with steam injection and indirect steam to approximately 255° C. before it is passed to a hydrothermal process. The pH of the treated waste activated sludge is then increased, and the nitrogen is stripped as an ammonium salt. A low nitrogen stream with volatile fatty acids and soluble organics is then separated and fed to the aerobic digester. Biogas generated during anaerobic digestion of the primary sludge provides energy for heating the waste activated sludge for the hydrothermal process, and reject heat from the hydrothermal process heats the primary sludge for thermophilic anaerobic digestion.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 3 is a table showing theoretical mass balances and operating conditions of the systems depicted in FIGS. 1 and 2.

DETAILED DESCRIPTION OF THE PREFERRED EMBODIMENT

Figure 1:
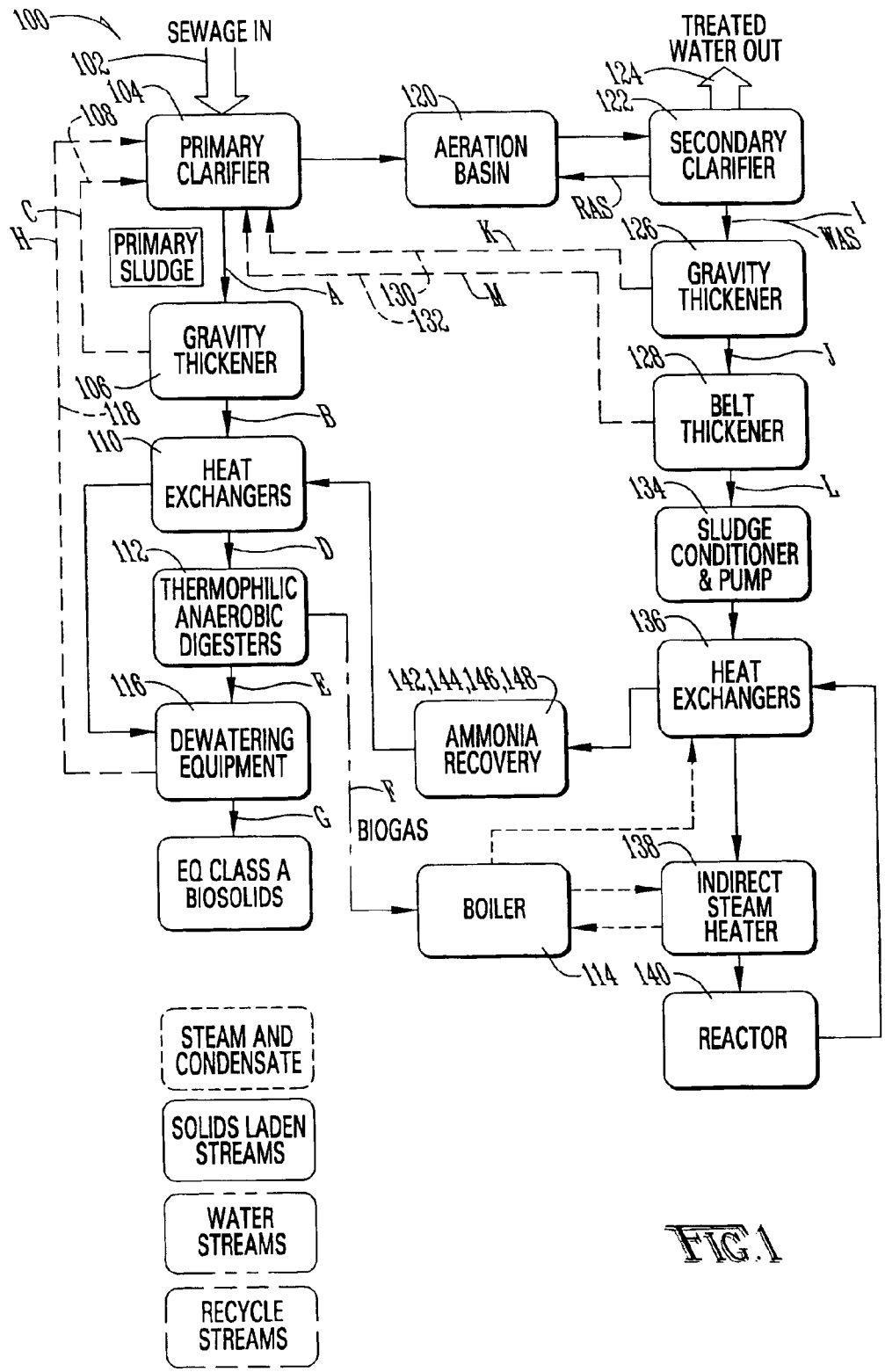
FIG. 1 is a flow chart showing a waste treatment system of the present invention.

Referring to FIG. 1, the reference numeral 100 refers in general to a system of the present invention. According to the present invention, an aqueous waste stream 102, such as raw sewage, wastewater, or the like is first subjected to pretreatment using equipment such as a bar screen and grit chamber (not shown) for removing much of the larger particulate matter. The pretreated waste stream 102 passes to a primary clarifier 104 where it is separated into a primary sludge, containing the bulk of the readily settleable material and a water effluent containing dissolved and suspended material. Pound for pound, the primary sludge will have most of the chemical energy of the waste stream. The water effluent will have significantly more nitrogen, approximately twice as much as the primary sludge.

The primary sludge is then passed to a gravity thickener 106 to remove some of the water. The primary sludge typically dewaters or thickens relatively easily to approximately 5%–9% solids by weight, most typically to approximately 5% solids by weight. Water is removed and passed via thickener return 108 to the primary clarifier 104. The thickened primary sludge then passes through a heat exchanger 110 to heat the thickened primary sludge as the thickened primary sludge passes to the anaerobic digester 112. The thickened primary sludge is preferably heated to a temperature so that the anaerobic digester 112 may operate under thermophilic or mesophilic conditions and is more preferably heated to a temperature so that the anaerobic digester 112 may operate under thermophilic conditions. The thickened primary sludge is heated to a temperature that is preferably greater than or equal to approximately 20° C., that is more preferably greater than or equal to approximately 40° C., and that is most preferably greater than or equal to approximately 60° C. Treating the thickened primary sludge in the anaerobic digester 112 yields a biogas and a digested primary sludge. Using staged anaerobic digestion of the thickened primary sludge typically yields up to approximately 63% conversion of volatile organics, and the anaerobic digestion process is highly resistant to shocks. The biogas passes to a boiler 114 for reasons to be described below. The digested primary sludge then passes to dewatering equipment 116. The dewatering equipment 116 produces a stream 118 that is primarily water, which is returned to the primary clarifier 104. The dewatered sludge from the dewatering equipment 116 is preferably a Class A biosolid and is more preferably an EQ Class A biosolid. This dewatered biosolid has a solid content that is preferably greater than or equal to approximately 20% by weight and that is more preferably greater than or equal to approximately 25% by weight.

The water effluent passes to an aerobic digester 120, such as an aeration basin or tank. The aerobic digester is preferably operated with aerobic and anoxic zones. The digested water effluent passes to a secondary clarifier 122 and is separated into a treated water discharge 124, a return activated sludge, and a waste activated sludge. The return activated sludge contains a large fraction of the bacteria that passes from the aerobic digester 120 to the secondary clarifier 122, although some of the bacteria is present in the waste activated sludge. Waste activated sludge is more difficult to dewater or thicken than the primary sludge. Waste activated sludge may typically be thickened to a solids content of approximately 3% to approximately 6% by weight. The waste activated sludge passes to and through a gravity thickener 126 and a belt thickener 128 and is dewatered or thickened to a solids content that is preferably approximately 5% weight and that is more preferably approximately 6% by weight. The high water content requires larger flows but provides properties close to those of water for heat transfer purposes. Water removed from the waste activated sludge by the gravity and belt thickeners 126 and 128 may be returned to the primary clarifier 104 via streams 130 and 132 respectively. The waste activated sludge contains approximately half of the solids that were originally contained in the raw waste stream but contains significantly less grit and large particulate matter than the primary sludge, so the waste activated sludge is better suited for pumping through process equipment, particularly at high temperatures and pressures. This reduces the capital costs, reduces wear and tear, and increases the reliability of the system 100.

The thickened waste activated sludge passes to the sludge conditioner and pump 134 and is pumped through heat exchangers 136 and 138 and into the reactor 140 for carrying out the hydrothermal process. As mentioned above, biogas from the anaerobic digester 112 is passed to the boiler 114 and where it is combusted to convert water to steam. The biogas generated by the anaerobic digester 112 is capable of providing between approximately 50% to approximately 100% of the heat energy needed for the hydrothermal process. This significantly reduces the operating costs of the system 100. Further, because only the waste activated sludge is subjected to a hydrothermal process, the energy required to operate the system 100 is significantly lower than would be needed if the primary sludge and waste activated sludge were both subjected to a hydrothermal process.

Figure 2:
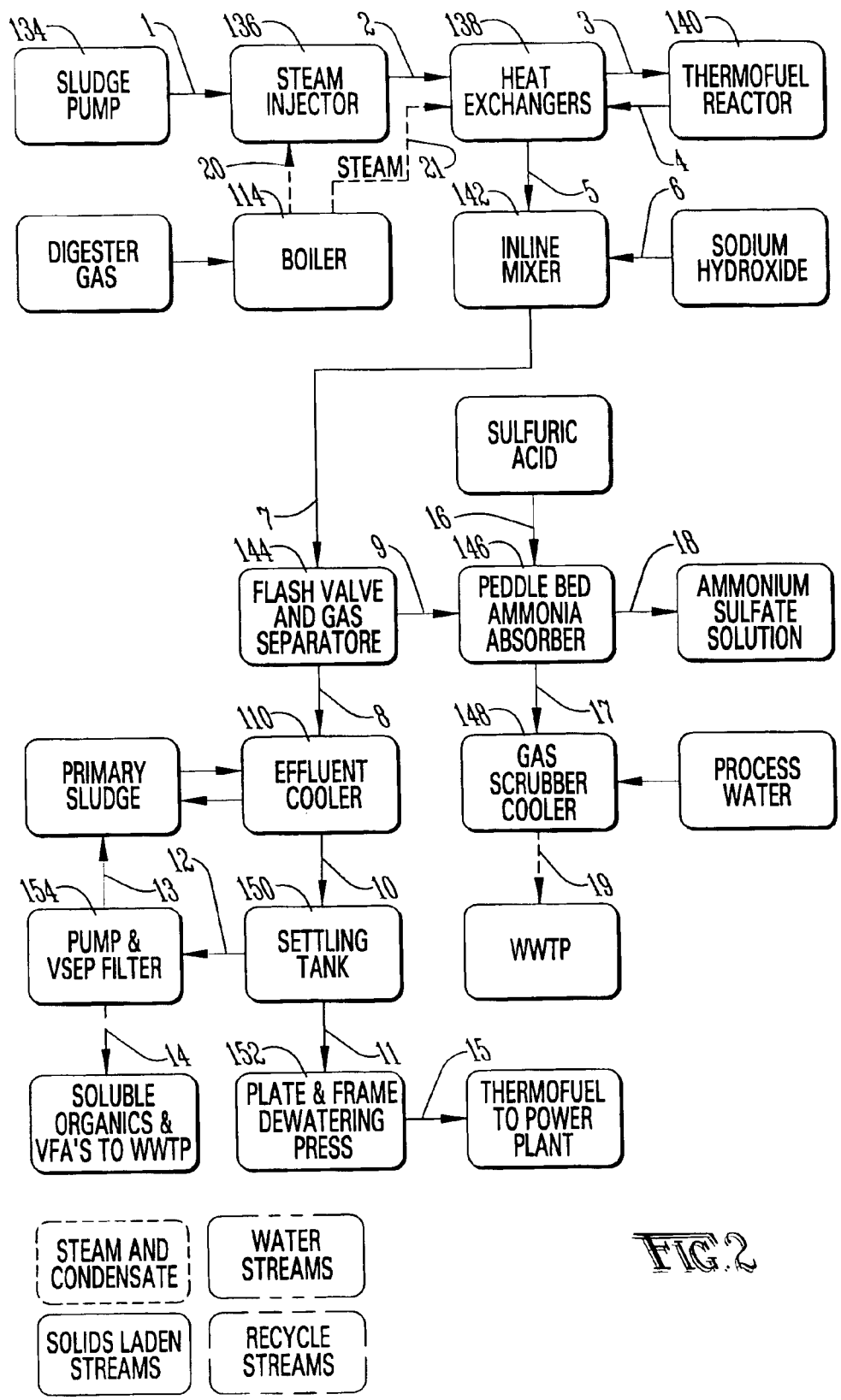
FIG. 2 is a flow chart focusing on the treatment of waste activated sludge according to the present invention.

As best seen in FIG. 2, the boiler 114 supplies steam to a steam injector 136 and to an indirect steam heater 138. This two-stage heating process helps to reduce or eliminate fouling or clogging conditions that are often encountered when subjecting a sludge to a hydrothermal process. When a sludge is heated it will often exhibit an undesirable degree of stickiness while it is within a temperature range of from approximately 60° C. to approximately 120° C., with this stickiness being more obvious while it is within a range of from approximately 68° C. to approximately 105° C. The thickened waste activated sludge of the present invention is therefore supplied to the steam injector 136 at a temperature that is preferably less than or equal to approximately 68° C., that is more preferably less than or equal to approximately 60° C., and that is most preferably approximately 57° C. Steam is injected into the thickened waste activated sludge to provide for extremely rapid heat transfer so that the stream almost instantaneously is heated to a temperature that is preferably greater than or equal to approximately 255° C., that is more preferably greater than or equal to approximately 120° C., and that is most preferably greater than or equal to approximately 105° C.

The boiler 114 also supplies steam to the indirect steam heat exchanger 138, such as a shell and tube type heat exchanger. As the preheated waste activated sludge passes through the indirect steam heat exchanger 138, it is passed in a heat exchange relationship with steam from the boiler 114 and then in a counter-current heat exchange relationship with a stream exiting the hydrothermal process reactor 140. In the indirect steam heat exchanger 138, the waste activated sludge is heated to a temperature that is preferably greater than or equal to approximately 200° C., that is more preferably greater than or equal to approximately 250° C. and that is most preferably greater than or equal to approximately 275° C. Using indirect steam heating reduces boiler 114 feed water consumption and further reduces capital and operating costs.

In the hydrothermal process reactor 140, the waste activated sludge is subjected to high temperature and pressure conditions to change the chemical composition of the stream. Any number of different hydrothermal processes may be used, including but not limited to a sludge-to-oil reactor system (STORS) process. A variety of common hydrothermal processes are discussed in more detail in U.S. Pat. Nos. 5,221,486, 5,433,868, and 6,143,176, the contents of which are incorporated herein by reference. As mentioned before, the effluent of the hydrothermal process reactor 140 passes through the heat exchanger 138 in counter-current flow with the preheated waste activated sludge before being further treated for nitrogen removal and the like.

The effluent from the hydrothermal process reactor 140 then passes to an inline mixer 142 in which a base such as sodium hydroxide is added to raise the pH. From the inline mixer 142, the stream passes to a flash valve and gas separator 144, and a vapor emission is flashed that is composed primarily of carbon dioxide gas with small amounts of hydrogen sulfide, ammonia, and the like. The flashed vapor passes to a pebble bed ammonia absorber 146, and sulfuric acid is added to lower the pH, which facilitates stripping nitrogen from the flashed vapor in the form of an ammonium salt solution, such as an ammonium sulfate solution. Vapor from the pebble bed ammonia absorber 146 is further treated, such as by passing it to a gas scrubber cooler 148, adding process water, and passing it for disposal or additional wastewater treatment processing. Using a simple process of raising the pH and stripping nitrogen in the form of ammonia and recovering an ammonium salt is much more energy efficient than subjecting the stream to yet another hydrothermal reaction to release the nitrogen in the form of nitrogen gas.

The reactor effluent from the flash valve and gas separator 144 is then passed to the heat exchanger or effluent cooler 110 where it is placed in an indirect heat exchange relationship with the primary sludge. The thickened primary sludge from gravity thickener 106 acts as a heat sink for the reject heat from the hydrothermal process. The thermal energy required to heat the primary sludge to the desired temperature for thermophilic anaerobic digestion corresponds closely to the energy available from the reactor effluent leaving the hydrothermal process. There is also a sufficient temperature difference between the streams to allow for efficient heat transfer. Using the reject heat from the hydrothermal process significantly reduces the operating costs of the system 100. Further, because only the thickened primary sludge is heated for anaerobic digestion, the energy required to operate the system 100 is significantly lower than would be required if the primary sludge and the waste activated sludge were both subjected to thermophilic anaerobic digestion. It is of course understood that the reactor effluent from the flash valve and gas separator 144 may provide thermal energy to the primary sludge in any number of different ways. For example, the reactor effluent may be used to heat water that is stored in a tank and used as needed.

The cooled reactor effluent leaves the heat exchanger 110 and passes to a settling tank 150. Settled solids are removed and dewatered, such as using a plate and frame dewatering press 152, or similar dewatering equipment 1116, to produce a char only or an oil and char fuel product. The fuel may be used in any number of ways, including to further offset operating costs of the system 100 if desired. The dissolved and suspended solids pass from the settling tank 150 to filtering equipment 154, such as a vibratory filter. The concentrated solids from the filtering equipment 154 may be passed to the thickened primary sludge. Stream 14 is a low nitrogen stream containing volatile fatty acids and soluble organics. It may be passed for further wastewater treatment processing, but at least a portion of this stream is preferably passed to the aeration basin or tank 120 to aid in aerobic/anoxic digestion. In that regard, this stream is beneficial to bacteria in an anoxic zone of the aeration tank 120 and can reduce or eliminate the need to add raw sewage or the need to add methanol to the aeration tank 120. The stream enhances biological nitrogen removal and biological phosphorus removal during aerobic/anoxic digestion.

Other modifications, changes and substitutions are intended in the foregoing, and in some instances, some features of the invention will be employed without a corresponding use of other features. For example, the primary sludge and waste activated sludge may both be subjected to the hydrothermal process, in which case nitrogen may be removed from the treated, combined sludge product by raising the pH and stripping the nitrogen in the form of ammonia gas for recovery as an ammonium salt. Further, the settled cooled stream from the settling tank 150 may be passed to its own separate dewatering equipment 152 or to the dewatering equipment 116 used to treat the digested primary sludge. Although clarifiers 104 and 122 and thickeners 106, 126, and 128 have been described, it is understood that any number of different types and kinds of equipment may be used to obtain the separation and filtration as needed. Further, although it is preferred to use a two-stage heating process with steam injection and indirect steam heating to prepare the waste activated sludge for the hydrothermal process, it is understood that either steam injection or indirect steam heating may be used in a single stage process. Further still, the use of direct steam injection to avoid fouling or clogging problems may be used in connection with a wide variety of hydrothermal processes or other sludge treatment steps to avoid similar problems when the sludge to be processed falls within the specified temperature ranges, regardless of whether other features of the present invention are also used. It is also understood that all quantitative information given is by way of example only and is not intended to limit the scope of the present invention. Accordingly, it is appropriate that the appended claims be construed broadly and in a manner consistent with the scope of the invention.

What is claimed is:

1. A method, comprising:
   (1) separating a waste stream into a primary sludge and a water effluent;
   (2) anaerobically digesting said primary sludge and dewatering said digested primary sludge to convert said primary sludge to a Class A biosolid without subjecting said primary sludge to a hydrothermal process;
   (3) aerobically digesting said water effluent;
   (4) separating said digested water effluent to provide a waste activated sludge; and
   (5) treating said waste activated sludge using a hydrothermal process without subjecting said waste activated sludge to anaerobic digestion.

2. The method of claim 1, further comprising:
   after step (4), heating said waste activated sludge to a temperature that is greater than or equal to approximately 200° C.

3. The method of claim 1, further comprising:
   after step (4), heating said waste activated sludge to a temperature that is greater than or equal to approximately 240° C.

4. The method of claim 1, further comprising:
   after step (4), injecting steam into said waste activated sludge to preheat said waste activated sludge from a first temperature that does not exceed approximately 60° C. to a second temperature that is greater than or equal to approximately 105° C.

5. The method of claim 1, further comprising:
   after step (4), injecting steam into said waste activated sludge to preheat said waste activated sludge from a first temperature that does not exceed approximately 68° C. to a second temperature that is greater than or equal to approximately 120° C.

6. The method of claim 4, further comprising:
   heating said preheated waste activated sludge from said second temperature to a third temperature that is greater than or equal to approximately 200° C.

7. The method of claim 4, further comprising:
   heating said preheated waste activated sludge from said second temperature to a third temperature that is greater than or equal to approximately 250° C.

8. The method of claim 1, further comprising:
   (6) generating heat from a biogas created during said anaerobic digestion of said primary sludge; and
   (7) before step (5), transferring said generated heat to said waste activated sludge.

9. The method of claim 8, wherein:
   step (6) comprises, combusting said biogas and transferring heat from combustion of said biogas to water to produce steam; and
   step (7) comprises, before step (5), transferring heat from said steam to said waste activated sludge.

10. The method of claim 8, further comprising:
    after step (5), transferring heat from said treated waste activated sludge to said primary sludge.

11. The method of claim 1, further comprising:
    (6) after step (5), raising a pH of said treated waste activated sludge; and
    (7) after step (6), stripping an ammonium salt from said treated waste activated sludge.

12. The method of claim 1, wherein:
    step (3) comprises aerobically digesting said water effluent in an aeration tank; and further comprising:
    after step (5), separating said treated waste activated sludge to provide a low nitrogen stream comprising volatile fatty acids and soluble organics; and
    feeding said stream to said aeration tank.

13. A method comprising:
    (1) providing a waste stream comprising at least one nitrogen containing compound, said waste stream being at a first temperature that is less than or equal to approximately 60° C.;
    (2) injecting steam into said waste stream to preheat said waste stream to a second temperature that is greater than or equal to approximately 255° C.; and
    (3) subjecting said preheated waste stream to indirect steam heating to heat said preheated waste stream to a third temperature that is greater than or equal to approximately 275° C.

14. The method of claim 13, wherein said first temperature is less than or equal to approximately 68° C. and said second temperature is greater than or equal to approximately 255° C.

15. The method of claim 13, wherein:
said waste stream comprises a waste activated sludge; and step (1) comprises:
providing a wastewater stream;
separating said wastewater stream into a primary sludge and a water effluent;
aerobically digesting said water effluent;
separating said waste activated sludge from said digested water effluent; and
providing said waste activated sludge at said first temperature.

16. The method of claim 15, further comprising:
anaerobically digesting said primary sludge to generate a biogas;
combusting said biogas to generate heat; and
transferring said biogas heat to water to generate said steam that is injected into said waste activated sludge.

17. A method, comprising:
(1) separating a waste stream into a primary sludge and a water effluent;
(2) anaerobically digesting said primary sludge to generate a biogas;
(3) treating said water effluent to create a waste activated sludge;
(4) combusting said biogas;
(5) transferring heat from said combustion of said biogas to said waste activated sludge to create a heated waste activated sludge; and
(6) passing said heated waste activated sludge through a heat exchanger to provide indirect heat transfer from said heated waste activated sludge to said primary sludge.

18. The method of claim 17, wherein step (5) comprises:
transferring heat from said combustion of said biogas to said waste activated sludge to create said heated waste activated sludge having a first temperature, said first temperature being greater than or equal to approximately 200° C.

19. The method of claim 17, wherein step (5) comprises:
transferring heat from said combustion of said biogas to said waste activated sludge to create said heated waste activated sludge having a first temperature, said first temperature being greater than or equal to approximately 250° C.

20. The method of claim 17, wherein:
step (3) comprises, treating said water effluent to create a waste activated sludge, said waste activated sludge having a first temperature that is less than or equal to approximately 60° C.; and
step (5) comprises:
transferring heat from said combustion of said biogas to water to generate steam;
injecting a first portion of said steam into said waste activated sludge to preheat said waste activated sludge to a second temperature that is greater than or equal to approximately 105° C.; and
placing a second portion of said steam in an indirect heat exchange relationship with said preheated waste activated sludge to heat said preheated waste activated sludge from said second temperature to a third temperature that is greater than or equal to approximately 200° C.

* * * * *